(12) United States Patent
Nishioka (10) Patent No.: US 9,445,309 B2
(45) Date of Patent: Sep. 13, 2016

(54) BANDWIDTH CONTROL DEVICE, BANDWIDTH CONTROL METHOD, AND WIRELESS NETWORK SYSTEM

(75) Inventor: Jun Nishioka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 859 days.

(21) Appl. No.: 13/513,392

(22) PCT Filed: Nov. 30, 2010

(86) PCT No.: PCT/JP2010/071329
§ 371 (c)(1),
(2), (4) Date: Jun. 12, 2012

(87) PCT Pub. No.: WO2011/070940
PCT Pub. Date: Jun. 16, 2011

(65) Prior Publication Data
US 2012/0243415 A1 Sep. 27, 2012

(30) Foreign Application Priority Data

Dec. 8, 2009 (JP) ................................. 2009-278499

(51) Int. Cl.
*H04W 28/14* (2009.01)
*H04W 28/10* (2009.01)
*H04W 28/18* (2009.01)

(52) U.S. Cl.
CPC ................... *H04W 28/18* (2013.01)

(58) Field of Classification Search
CPC ... H04L 5/0037; H04L 5/006; H04L 5/0064; H04L 5/0078; H04L 5/0094; H04N 21/24
USPC ...................................................... 370/235.1
See application file for complete search history.

(56) References Cited

U.S. PATENT DOCUMENTS 5,787,077 A * 7/1998 Kuehnel et al. ............... 370/331
5,982,748 A * 11/1999 Yin et al. ...................... 370/232
(Continued)

FOREIGN PATENT DOCUMENTS

| JP | 2007-266719 | 10/2007 |
|---|---|---|
| JP | 2009-027530 | 2/2009 |
| WO | WO 2010/090311 | 8/2010 |

OTHER PUBLICATIONS

International Search Report, PCT/JP2010/071329, Dec. 28, 2010.
(Continued)

*Primary Examiner* — Andrew Chriss
*Assistant Examiner* — Ellen A Kirillova
(74) *Attorney, Agent, or Firm* — Young & Thompson (57) ABSTRACT

In a network configured using a wireless link in which a transmission rate fluctuates, accommodation efficiency of traffic is improved while communication quality of VBR traffic is maintained. A bandwidth control device includes a stability level calculation unit which calculates a stability level indicating a probability that a bandwidth is available in a wireless link using adaptive modulation, a utilization rate calculation unit which calculates a utilization rate of a bandwidth used by traffic to be accommodated, an allocation unit which allocates, to the traffic, a link bandwidth of the stability level corresponding to the utilization rate of the traffic, and a path control unit which sets a path for the traffic in the wireless network including a communication device that performs communication over the wireless link based on the allocated link bandwidth.

16 Claims, 9 Drawing Sheets

(56) References Cited

U.S. PATENT DOCUMENTS

| | | | |
|---|---|---|---|
| 2002/0110149 A1* | 8/2002 | Roberts et al. | 370/477 |
| 2006/0215556 A1* | 9/2006 | Wu | H04W 4/12 370/230 |
| 2007/0049207 A1* | 3/2007 | Haghighat et al. | 455/69 |
| 2007/0223427 A1 | 9/2007 | Nakatsugawa | |
| 2011/0131331 A1* | 6/2011 | Brunson et al. | 709/227 |

OTHER PUBLICATIONS

Jun Nishioka, Satoru Yamano, "A Study on Routing over AMC-enabled FWA Mesh Network", IEICE Technical Report, Jan. 15, 2009, vol. 108, No. 392, pp. 49 to 54, NS2008-134.

Eun-Chan Park et al., Proportional Bandwith Allocation in DiffServ Networks, IEEE INFOCOM 2004.

* cited by examiner

BANDWIDTH CONTROL DEVICE, BANDWIDTH CONTROL METHOD, AND WIRELESS NETWORK SYSTEM

TECHNICAL FIELD

The present invention relates to a bandwidth control device of a wireless network, a bandwidth control method of a wireless network, and a wireless network system. In particular, the present invention relates to a bandwidth control device, a bandwidth control method, and a wireless network system which perform bandwidth control of traffic for a network configured with a wireless link using adaptive modulation.

BACKGROUND ART

In mobile telephone networks, communication based on fixed wireless access (FWA) using millimeter waves is widely used. Communication quality of a wireless link is affected by a wireless environment such as a signal to noise ratio (SNR) of a received signal. Accordingly, in order to realize a wireless link having a broader band, adaptive modulation technology is being focused on.

The adaptive modulation technology is technology which adaptively finds and employs a modulation scheme with which transmission efficiency is best from a wireless state of a wireless link. Because it is possible to perform the optimum wireless communication corresponding to a wireless environment if the adaptive modulation technology is used, expectations for the adaptive modulation as technology for improving frequency efficiency have increased.

However, because a link bandwidth varies with the passage of time in the case of the above-described wireless link, it is difficult to efficiently perform bandwidth allocation for traffic flowing through the same link. It is to be noted that if bandwidth control or priority control such as the bandwidth allocation is not performed, traffic having the largest traffic amount at that time is likely to monopolize a bandwidth. Consequently, a problem to be solved is how to control bandwidth allocation among traffic.

Incidentally, in DiffServ, asynchronous transfer mode (ATM), or the like, bandwidth control is performed using a committed information rate (CIR), which is a bandwidth in which minimum traffic can be maintained even during congestion. Thereby, it is possible to fairly perform bandwidth allocation among traffic having the same priority to a certain extent. It is to be noted that a bandwidth allocation method depending on the magnitude of the CIR is proposed in Non-Patent Document 1.

In addition, Patent Document 1 discloses a method for allocating a bandwidth at a constant rate as a method for allocating a bandwidth to traffic in a link such as a wireless link in which the bandwidth fluctuates.

Further, the following method is disclosed in Patent Document 2. That is, when a wireless link uses a modulation scheme that provides a minimum transmission rate for a bandwidth required by traffic, it is first determined whether or not the required bandwidth can be allocated, and the required bandwidth is allocated to the traffic if the required bandwidth can be allocated. Thereafter, if the wireless link uses a modulation scheme that provides a higher transmission rate, an extra bandwidth is allocated to best-effort traffic, which does not require bandwidth guarantee.

PRIOR ART DOCUMENTS

Patent Documents

Patent Document 1: Japanese Unexamined Patent Application, First Publication No. 2009-27530
Patent Document 2: Japanese Unexamined Patent Application, First Publication No. 2007-266719

Non-Patent Document

Non-Patent Document 1: "Proportional Bandwidth Allocation in DiffServ Networks", Eun-Chan Park et al., IEEE INFOCOM 2004

SUMMARY OF INVENTION

Problems to be Solved by the Invention

Incidentally, because a link bandwidth is fixed in a wired network in accordance with the related art, a situation in which the bandwidth is unavailable due to a factor other than a link failure does not occur. Thus, a problem of fluctuation of a stability level of the bandwidth does not occur. However, there is a problem in that a link bandwidth fluctuates depending on a link state in a wireless link having an adaptive modulation function.

In addition, in the case of the wireless link having the adaptive modulation function, a bandwidth allocation method for use in DiffServ or the like targeted at the wired network has a problem in that an unstable bandwidth is carelessly allocated to high-priority traffic and a quality degradation rate of the traffic is increased.

As a method for solving the above-described problems, a bandwidth to be allocated to traffic may be limited to only an absolutely available bandwidth in a link bandwidth. However, this method has a problem in that an extra bandwidth cannot be allocated to the traffic and traffic accommodation efficiency is degraded.

Further, in the related art, in the case of bandwidth allocation for use in the wireless network, a stability level of a bandwidth is not finely considered. For example, in the above-described Patent Document 2, the link bandwidth is merely classified into a bandwidth of a minimum transmission rate and bandwidths of the other transmission rates. Thus, a stable link bandwidth in a bandwidth of the minimum transmission rate or more cannot be allocated to high-priority traffic and traffic accommodation efficiency is degraded.

That is, the method in accordance with the related art does not consider the stability level of an extra bandwidth that is greater than or equal to a bandwidth (minimum bandwidth) in which the wireless link can secure at a minimum. Thus, if bandwidth allocation for traffic is performed in accordance with only a CIR of the traffic and the minimum bandwidth of the wireless link, the traffic accommodation efficiency is degraded. Also, in the case of traffic in which there is a difference between the CIR and a peak rate such as variable bit rate (VBR) traffic, it may be impossible to allocate a bandwidth considering a utilization rate of traffic between the CIR and the peak rate and the stability level of the extra bandwidth. As a result, the extra bandwidth is unavailable when the traffic is required to use the extra bandwidth. Thus, there is a problem in that traffic communication quality is degraded and network resources are not used efficiently because the extra bandwidth is not utilized.

Further, when the extra bandwidth is allocated for the CIR of traffic to be accommodated without consideration of the stability level of a bandwidth, the traffic accommodation efficiency is improved. However, there is a problem in that the CIR of the traffic cannot be guaranteed once the transmission rate is reduced, and the traffic communication quality is degraded.

As seen from the above, traffic engineering is necessary which takes the stability level of a link in a wireless network into consideration, maintains traffic communication quality, and improves traffic accommodation efficiency.

The present invention has been made in view of the above-described problems of the related art, and an exemplary object thereof is to provide a bandwidth control device, a bandwidth control method, and a wireless network system which improve the traffic accommodation efficiency while maintaining communication quality of VBR traffic in a network configured using a wireless link in which a transmission rate fluctuates.

Means for Solving the Problems

In order to solve the above-described problems, a bandwidth control device of a wireless network in accordance with the present invention includes: a stability level calculation unit which calculates a stability level indicating a probability that a bandwidth is available in a wireless link using adaptive modulation; a utilization rate calculation unit which calculates a utilization rate of a bandwidth used by traffic to be accommodated; an allocation unit which allocates, to the traffic, a link bandwidth of the stability level corresponding to the utilization rate of the traffic; and a path control unit which sets a path for the traffic in the wireless network including a communication device that performs communication over the wireless link based on the allocated link bandwidth.

In addition, a communication device in accordance with the present invention includes: queues with priorities the number of which is the same as the number of modulation schemes available to a wireless link using adaptive modulation; and a control unit which performs bandwidth control of traffic corresponding to a transmission rate by storing packets constituting a packet group belonging to the traffic in the queues in accordance with a control bandwidth and a path for the traffic, which are set by a path control device based on a stability level indicating a probability that a bandwidth is available in the wireless link and a utilization rate of a bandwidth used by the traffic, and an inflow amount of the traffic, and outputting the packets in order from a higher priority queue among the queues.

In addition, a communication device in accordance with the present invention, includes: a single queue provided for each wireless link using adaptive modulation; and a control unit which performs bandwidth control of traffic corresponding to a transmission rate by storing a packet belonging to the traffic in the single queue in association with a modulation scheme in accordance with a control bandwidth and a path for the traffic, which are set by a path control device based on a stability level indicating a probability that a bandwidth is available in the wireless link and a utilization rate of a bandwidth used by the traffic, and an inflow amount of the traffic, dropping a packet associated with a modulation scheme other than a modulation scheme used by the wireless link, and outputting a packet associated with the modulation scheme used by the wireless link from the single queue.

In addition, a bandwidth control method in accordance with the present invention includes: calculating a stability level indicating a probability that a bandwidth is available in a wireless link using adaptive modulation; calculating a utilization rate of a bandwidth used by traffic to be accommodated; allocating, to the traffic, a link bandwidth of the stability level corresponding to the utilization rate of the traffic; and setting a path for the traffic in the wireless link based on the allocated link bandwidth.

Further, a wireless network system in accordance with the present invention includes the bandwidth control device of the wireless network and the communication device.

Effects of the Invention

As described above, in the present invention, a stability level indicating the probability that a bandwidth is available in a wireless link and a utilization rate of a bandwidth used by traffic to be accommodated are calculated, and a link bandwidth of the stability level corresponding to the utilization rate of the traffic is allocated to the traffic. Thus, it is possible to perform bandwidth control depending on fluctuation of the link bandwidth for the traffic. Therefore, it is possible to accommodate more traffic while maintaining the traffic communication quality.

MODE(S) FOR CARRYING OUT THE INVENTION

In accordance with an exemplary embodiment and examples of the present invention, a bandwidth control device of a wireless network pre-calculates a stability level indicating the reliability in using a wireless link bandwidth from a history of modulation schemes previously used in a wireless link using adaptive modulation or a past history regarding information indicating a radio wave environment of the wireless link, and classifies the link bandwidth for each stability level.

In addition, similarly, the bandwidth control device classifies a bandwidth to be secured for traffic in accordance with its utilization rate (occupancy level).

Based on these results, the bandwidth control device allocates a bandwidth of a corresponding stability level to the traffic in accordance with the utilization rate of the bandwidth to be secured for the traffic. As a result, it is possible to guarantee a bandwidth based on the stability level and the utilization rate for the traffic.

By performing the foregoing course of actions, it is possible to prevent communication quality from being degraded due to allocation of an unstable link bandwidth as a bandwidth constantly used by the traffic.

That is, the bandwidth control device allocates a bandwidth capable of being stably secured in a link bandwidth as a bandwidth constantly generated by the traffic. In contrast, for a bandwidth having strong burst characteristics in a bandwidth generated by the traffic, the bandwidth control device allocates a bandwidth in which the stability level is low and which conforms to a rate of occurrence thereof in the same link bandwidth. By doing so, it is possible to improve accommodation efficiency of the traffic by utilizing an unstable bandwidth in transmission of burst traffic while keeping communication quality of the traffic constant.

Hereinafter, a bandwidth control device of a wireless network, a bandwidth control method of a wireless network, and a wireless network system in accordance with an exemplary embodiment and examples of the present invention will be sequentially described in detail with reference to the drawings.

Figure 1:
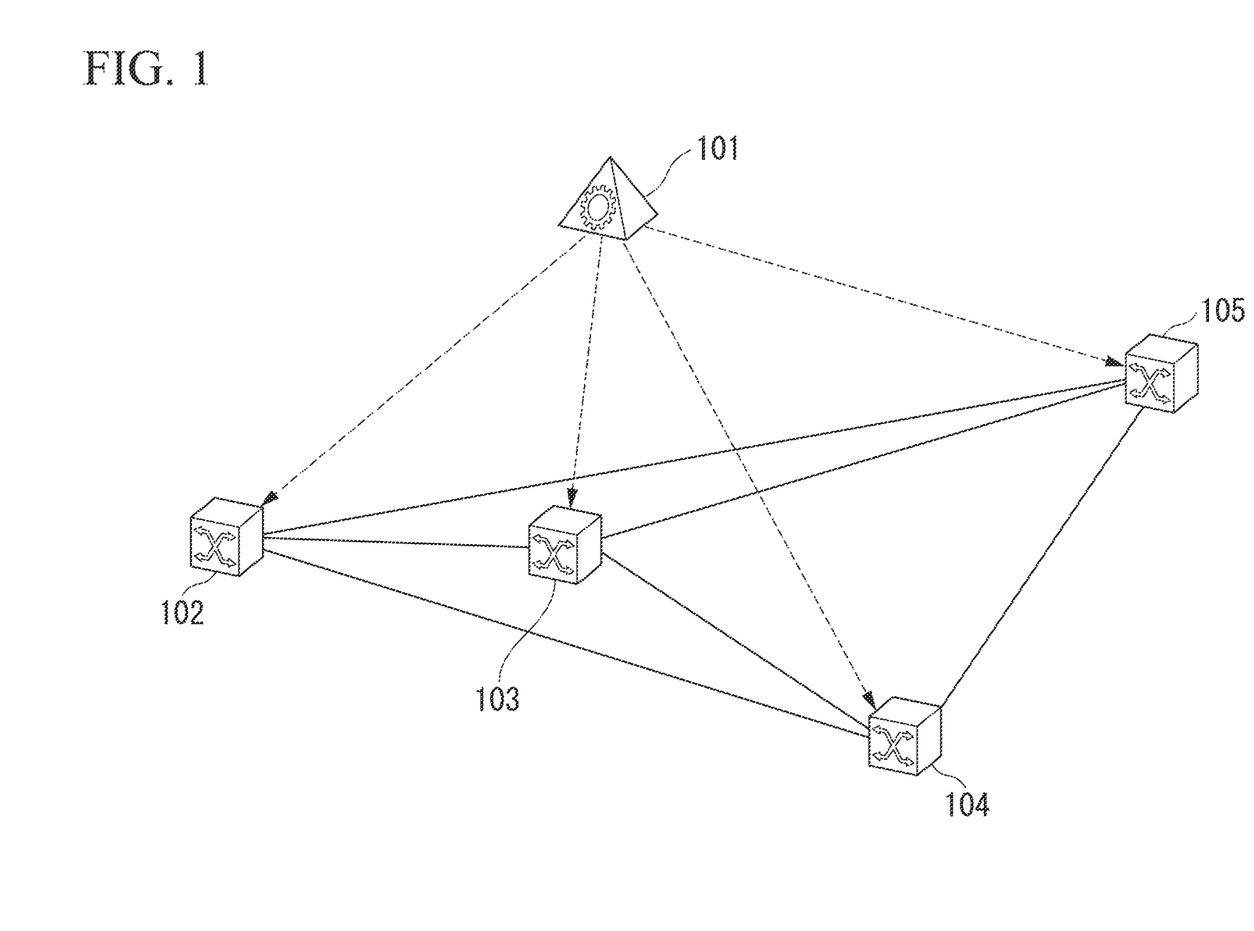
FIG. 1 is a configuration diagram illustrating the entire configuration of a wireless network system in accordance with an exemplary embodiment of the present invention.

FIG. 1 is a configuration diagram illustrating the entire configuration of the wireless network system in accordance with the exemplary embodiment of the present invention.

In the drawing, the wireless network system of the present exemplary embodiment includes a path control device 101 (bandwidth control device) which calculates a path, and communication devices 102 to 105 (routers or switches) which transfer packets with a plurality of wireless links.

Figure 2:
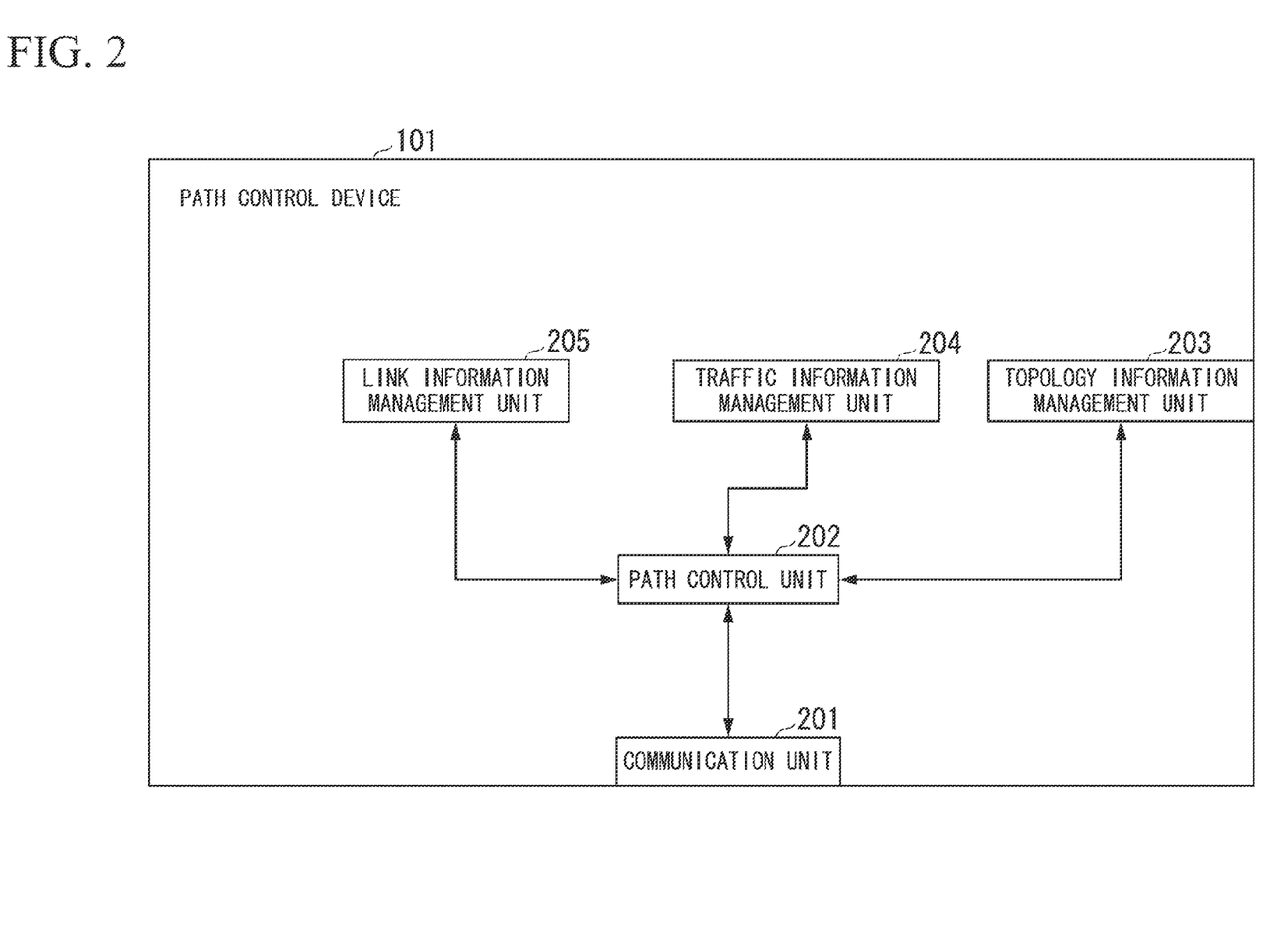
FIG. 2 is a block diagram illustrating a configuration example of a path control device.

FIG. 2 is a block diagram illustrating a configuration example of the path control device.

As illustrated in the drawing, the path control device 101 is configured to include a communication unit 201, a path control unit 202, a topology information management unit 203, a traffic information management unit 204, and a link information management unit 205.

The path control unit 202 has a path setting function of carrying out a path calculation to calculate a path for traffic, and reporting the path calculated by the path calculation or the like to the communication devices within the network. When a path of newly generated traffic is calculated, the path control unit 202 writes information (for example, bandwidth information) regarding a result of the traffic path calculation and the traffic to the traffic information management unit 204. In addition, the path control unit 202 acquires information regarding existing traffic from the traffic information management unit 204, if necessary, such as when a process of ending the existing traffic is performed. Further, when setting of the path is performed, the path control unit 202 sets a bandwidth for each modulation scheme allocated to traffic in each link for each communication device on the path.

The topology information management unit 203 manages network information indicating how the network is configured, for example, connection information between nodes, an adjacency relationship of a node, and a link.

The traffic information management unit 204 acquires traffic information such as a transmission source, a destination, a used bandwidth, and a path for traffic flowing through the network, from the path control unit 202, and manages the traffic information. It is to be noted that in this Description, "management" of information means that the information is written, stored, and read.

The link information management unit 205 acquires link quality information indicating the state of each link (e.g., a bit error rate (BER), an SNR, or a carrier to interference and noise ratio (CINR)) and stability-level information of a currently used modulation scheme, a previously used modulation scheme, and an estimated modulation scheme via the network, and manages the acquired information.

It is to be noted that as a technique for collecting the stability-level information for each modulation scheme, for example, the following two techniques may be considered, and any one of the techniques may be used. The path control unit 202 calculates a path by acquiring a stability level of each modulation scheme in accordance with any one of the techniques.

First Technique:

The path control unit 202 collects the link quality information such as a BER of a wireless link from each communication device via the network, and stores the collected link quality information into the link information management unit 205. In addition, when the path is searched for, the path control unit 202 calculates the stability level of each modulation scheme of each link based on the link quality information stored in the link information management unit 205.

Second Technique:

Each communication device periodically reports the stability level calculated by each communication device itself to the path control device 101 along with link quality information of its own link. The path control unit 202 stores the link quality information and the stability level reported from each communication device into the link information management unit 205.

A main function of the path control unit 202 is to acquire the traffic information from the traffic information management unit 204, acquire the link quality information and the stability-level information from the link information management unit 205, calculate a bandwidth assignable to new traffic in each link, and calculates a path for the new traffic based on topology information secured by the topology information management unit 203.

Figure 3:
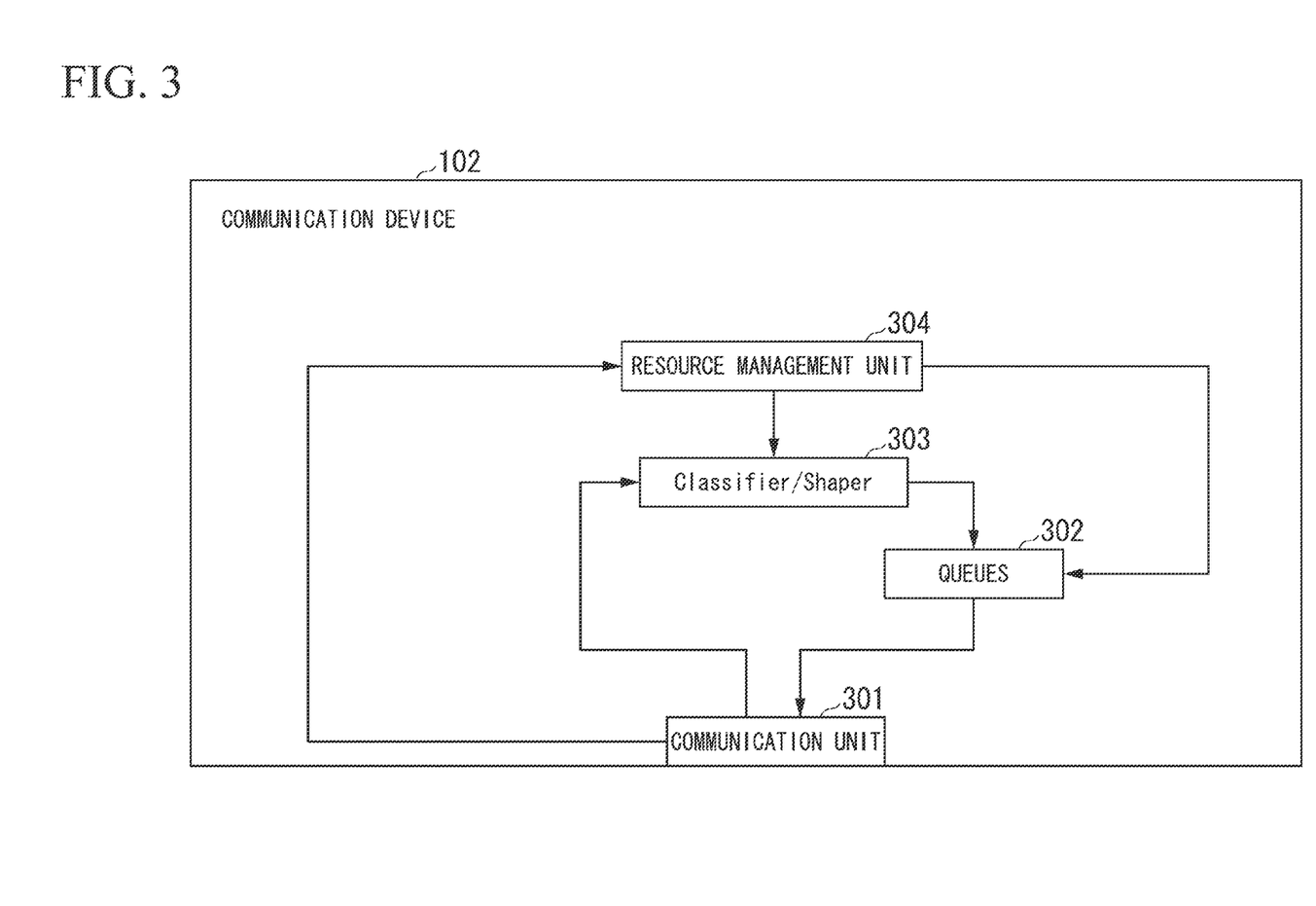
FIG. 3 is a block diagram illustrating a configuration example of a communication device.

FIG. 3 is a block diagram illustrating a configuration example of the communication devices.

The communication device 102 illustrated in FIG. 1 includes a communication unit 301, queues 302, a classifier/shaper 303, and a resource management unit 304. It is to be noted that the other communication devices 103 to 105 also have the same configuration as the communication device 102.

Hereinafter, the function of the communication device 102 illustrated in FIG. 3 will be described.

The communication unit 301 is a structural component including a plurality of wireless links. The communication unit 301 has a function of notifying the path control device 101 of link quality information such as BERs of its own managed links and stability-level information indicating stability levels of a currently used modulation scheme, a previously used modulation scheme, and an estimated modulation scheme.

The queues 302 have a function of storing packets transmitted via the communication unit 301 in order of transmission. In addition, the queues 302 are provided for respective wireless links. Further, the queues are created for respective modulation schemes in the wireless links. That is, queues are provided so that the number of the queues is the same as the number of modulation schemes available to the wireless links. It is to be noted that basically, the lower the transmission rate of the modulation scheme, the higher the stability, and thus a queue of a modulation scheme that provides a lower transmission rate is more preferentially processed.

The classifier/shaper 303 classifies packets based on control information from the resource management unit 304. For example, the classifier/shaper 303 performs a process corresponding to a bandwidth allocated to traffic (packet marking or selection of a queue in which a packet should be placed).

The resource management unit 304 manages control bandwidth information for each modulation scheme of each piece of traffic. For example, the resource management unit 304 manages information of traffic flowing through a link (an allocation bandwidth of each modulation scheme).

The communication unit 301 monitors its own managed links, detects a change of a used modulation scheme, and reports it to the resource management unit 304.

The resource management unit 304 requests the queues 302 and the classifier/shaper 303 to change a parameter as previously set from the path control device 101. Here, the parameter is an allocation bandwidth of each modulation scheme allocated to traffic in each link. For example, the parameter indicates that a bandwidth capable of being secured in QPSK is allocated to traffic of 5 Mbps within traffic of 10 Mbps and a bandwidth capable of being secured in 16 QAM is allocated to the remaining traffic of 5 Mbps. In accordance with the parameter, the classifier/shaper 303 places the traffic of 5 Mbps within the traffic of 10 Mbps in the queue of QPSK and places the remaining traffic of 5 Mbps in the queue of 16QAM.

It is to be noted that here the function of the communication device 102 has been described, but the communication devices 103 to 105 also have the same function as the communication device 102.

Characteristic control in accordance with the exemplary embodiment and examples of the present invention is performed in the path calculation carried out by the path control unit 202 of the path control device 101.

Figure 4:
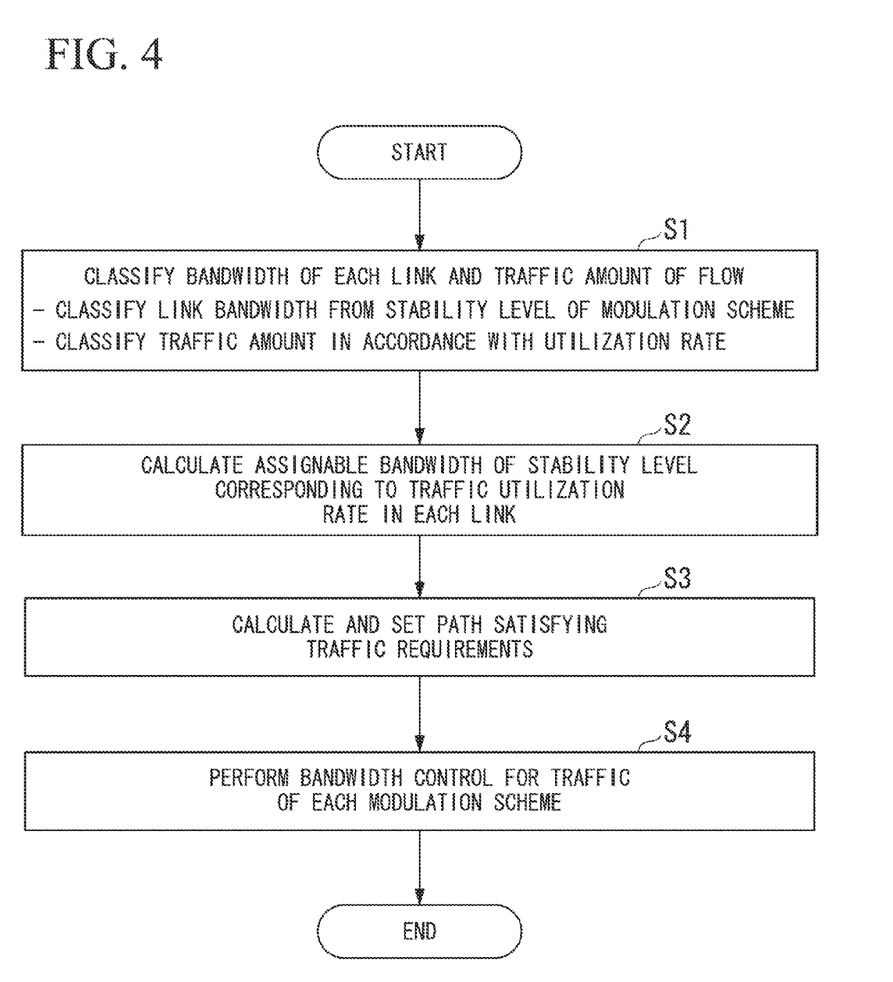
FIG. 4 is a flowchart illustrating an operation procedure for allocating a bandwidth based on a stability level of a link bandwidth and a utilization rate of traffic.

FIG. 4 is a flowchart illustrating an operation procedure of allocating a bandwidth based on a stability level of a link bandwidth and a utilization rate of traffic.

Hereinafter, an operation procedure of allocating a bandwidth based on a stability level of a link bandwidth and a utilization rate of traffic will be described with reference to FIG. 4. It is to be noted that the operation in steps S1 to S3 is performed by the path control device 101, and the operation in step S4 is performed by the communication devices 102 to 105.

(Step S1) In step S1, the path control unit 202 of the path control device 101 classifies a bandwidth of each wireless link in the communication unit 301 and a traffic amount of a flow. More specifically, first, the path control unit 202 reads a path for traffic from the traffic information management unit 204 and reads a BER, an SNR, or a CINR in the path from the link information management unit 205, and calculates a stability level for each modulation scheme using the read path and BER, SNR, or CINR. Next, the path control unit 202 classifies a link bandwidth based on the calculated stability level, and classifies the traffic amount of the flow in accordance with the utilization rate.

(Step S2) In step S2, the path control unit 202 calculates an assignable bandwidth at the stability level corresponding to the utilization rate of the traffic in each link.

(Step S3) In step S3, the path control unit 202 calculates a path in order from a link satisfying a condition required by the traffic. In addition, the path control unit 202 reports information regarding bandwidth allocation or the like to each communication device via the communication unit 201.

(Step S4) In step S4, the communication devices 102 to 105 perform bandwidth control for traffic of each modulation scheme to be used (each transmission rate corresponding to the modulation scheme to be used) in a link on the path based on the information reported from the path control device 101.

It is to be noted that in general, steps S1 to S4 are iterated in a predetermined cycle.

Here, the stability level of the bandwidth calculated in step S1 described above is an index indicating a degree to which the wireless link can guarantee the bandwidth. That is, because the transmission rates of respective modulation schemes are different from each other in the wireless link having the adaptive modulation function, the index indicates the probability that a link bandwidth that can be used only by using each modulation scheme is available.

Hereinafter, a specific process in steps S1 to S4 will be described in greater detail with reference to FIGS. 5A and 5B.

Figure 5A:
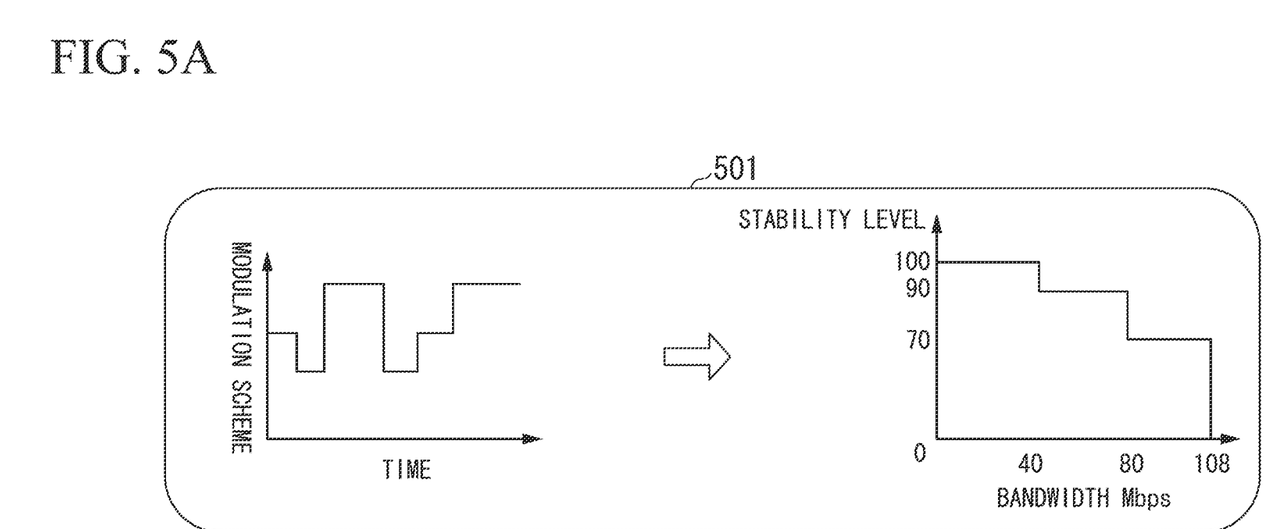
FIG. 5A is an explanatory diagram illustrating a relationship between a time and a modulation scheme and a relationship between a bandwidth and a stability level to be referred to when the stability level of a link bandwidth and a utilization rate of traffic are obtained in a bandwidth control device of a wireless network in accordance with an exemplary embodiment of the present invention.
Figure 5B:
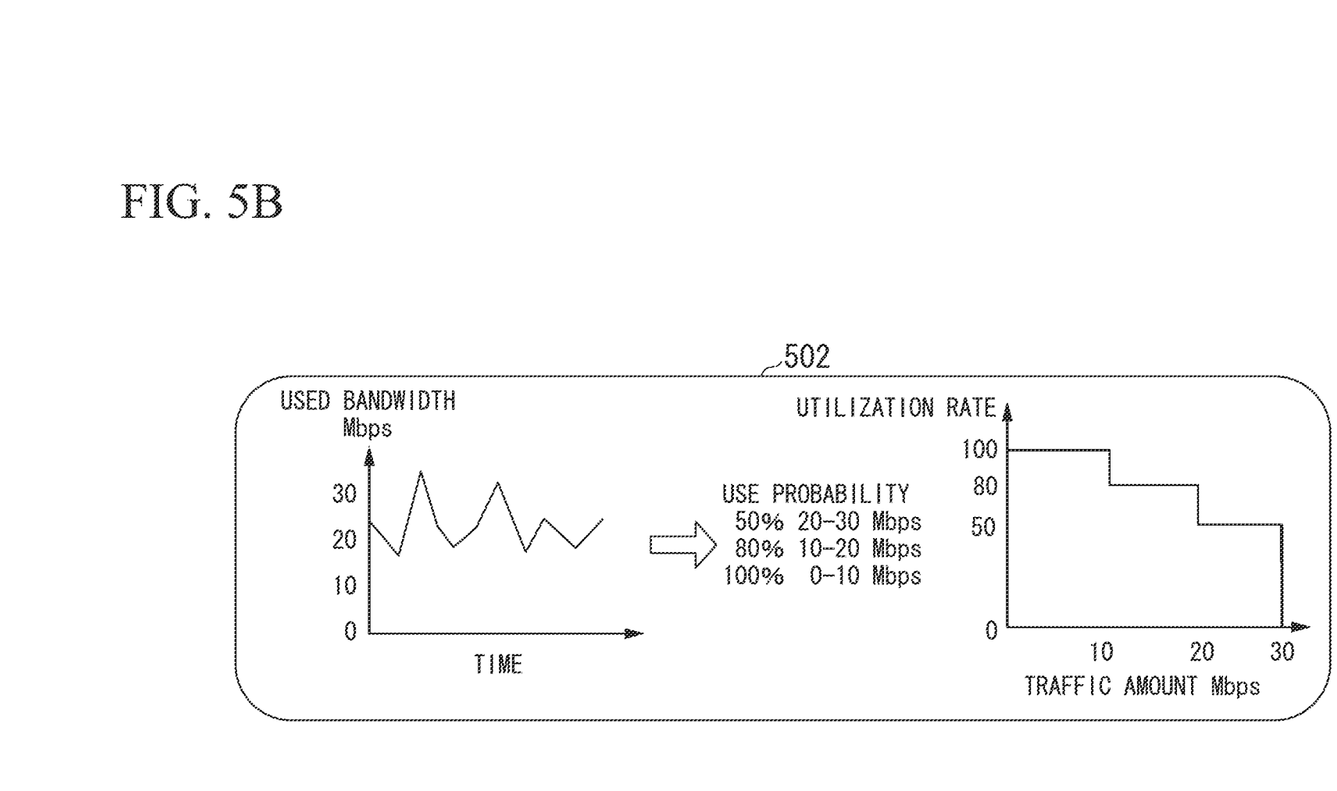
FIG. 5B is an explanatory diagram illustrating a relationship between a time and a used bandwidth and a relationship between a traffic amount and a utilization rate to be referred to when the stability level of the link bandwidth and the utilization rate of the traffic are obtained in the bandwidth control device of the wireless network in accordance with the exemplary embodiment of the present invention.

FIGS. 5A and 5B are explanatory diagrams illustrating relationships to be referred to when the bandwidth control device of the wireless network in accordance with the exemplary embodiment of the present invention obtains the stability level of the link bandwidth and the utilization rate of the traffic. More specifically, a graph 501 illustrated in FIG. 5A indicates a relationship between a time and a modulation scheme and a relationship between a bandwidth and a stability level. A graph 502 illustrated in FIG. 5B indicates a relationship between a time and a used bandwidth and a relationship between a traffic amount and a utilization rate.

As illustrated in FIG. 5A, modulation schemes available in a wireless link between the communication device 102 and the communication device 105 in FIG. 1 are assumed to be quadrature phase shift keying (QPSK), in which the transmission rate is 40 Mbps, 16 quadrature amplitude modulation (QAM), in which the transmission rate is 80 Mbps, and 32 QAM, in which the transmission rate is 108 Mbps. In addition, the stability levels of the modulation schemes (the probabilities that bandwidths are available) are assumed to be QPSK: 100%, 16 QAM: 90%, and 32 QAM: 70%. In this case, in the wireless link, the stability level of a bandwidth of 0 to 40 Mbps becomes 100, the stability level of a bandwidth of 40 to 80 Mbps becomes 90, and the stability level of a bandwidth of 80 to 108 Mbps becomes 70.

Hereinafter, an example of a method for calculating a stability level of a modulation scheme to be performed by the path control unit 202 will be described.

The stability level of the modulation scheme can be calculated based on information indicating a radio wave environment, for example, a signal to noise ratio (SNR), a carrier to interference and noise ratio (CINR), or the like.

When a stability level is calculated based on the SNR, the path control unit 202 acquires SNR data recorded, for example, for each given period, and calculates a stability level from a ratio satisfying an allowable SNR in each modulation scheme. Also, when a stability level is calculated based on the CINR, the path control unit 202 calculates the stability level using CINR data as in the case in which the stability level is calculated based on the SNR.

Alternatively, it is possible to calculate the stability level of the modulation scheme based on a history of modulation schemes previously used in the wireless link. For example, when a set of modulation schemes are M=(QPSK, 16 QAM, . . . , 256 QAM) and a period during which each modulation scheme in a given period T has been used is $T_M$, the stability level of the modulation scheme can be obtained as a ratio between T and the sum of $T_M$ of each modulation scheme and $T_M$ of modulation schemes having higher transmission rates than that of each modulation scheme.

Moreover, in addition to the above-described method, the stability level of the modulation scheme can also be calculated using a past history (statistical information) of a bit error rate (BER), or the like. It is to be noted that this BER itself is one of pieces of information indicating the radio wave environment. When the stability level is calculated using the BER, the path control unit 202 acquires a BER of each modulation scheme, for example, from periodic measurement or a past history, obtains a ratio at which the BER is held under a given value, and determines the obtained ratio as the stability level of each modulation scheme.

In addition, the utilization rate of the traffic calculated in step S1 indicates a ratio at which the traffic is required to secure a bandwidth during a given period. Specifically, it is possible to obtain the utilization rate of the traffic as will be described below.

That is, as illustrated in FIG. 5B, when at least 10 Mbps should be constantly secured (use probability 100%), a bandwidth of 10 to 20 Mbps should be secured at a ratio of 80% (use probability 80%), and a bandwidth of 20 to 30 Mbps should be secured at a ratio of 50% (use probability 50%) during a given period, the path control unit 202 calculates a utilization rate of 0 to 10 Mbps as 100, calculates a utilization rate of 10 to 20 Mbps as 80, and calculates a utilization rate of 20 to 30 Mbps as 50. In step S1, traffic is also classified for each ratio at which the bandwidth should be secured as in the case in which the link bandwidth is classified for each stability level.

Alternatively, the utilization rate of the traffic may be obtained based on a history of previously used bandwidths in traffic. For example, the utilization rate of the traffic is obtained using data on traffic in a given period T in the past. That is, traffic is classified into ranges of d [Mbps], such as 0 to d [Mbps], d to 2d [Mbps], and 2d to 3d [Mbps], and a ratio at which a traffic amount within each range has been used in the period T is calculated. For example, if a traffic amount of 0 [Mbps] or more corresponds to the period T, a traffic amount of d [Mbps] or more corresponds to a period 0.7T, and a traffic amount of 2d [Mbps] or more corresponds to a period 0.5T in the period T, the utilization rate of the traffic in the range of 0 to d [Mbps] becomes 100, the utilization rate of the traffic in the range of d to 2d [Mbps] becomes 70, and the utilization rate of the traffic in the range of 2d to 3d [Mbps] becomes 50.

In step S2, the path control unit 202 searches for an available bandwidth of a stability level corresponding to the utilization rate of the traffic in each link. Here, the path control unit 202 classifies the bandwidth of traffic in accordance with the utilization rate based on a result of classification in step S1, and determines whether or not the traffic can be allocated to a link bandwidth of a stability level having a value that is greater than or equal to the utilization rate for each bandwidth.

Specifically, for each wireless link, the path control unit 202 determines whether or not a link bandwidth having the stability level that is greater than or equal to 100 can be allocated to traffic in which the utilization rate is 100%, determines whether or not a link bandwidth having the stability level that is greater than or equal to 80 can be allocated to traffic in which the utilization rate is 80%, and determines whether or not a link bandwidth having the stability level that is greater than or equal to 50 can be allocated to traffic in which the utilization rate is 50%.

Here, in the case of the wireless link having the features illustrated in FIGS. 5A and 5B, the path control unit 202 allocates a link bandwidth in which the stability level is 100 to traffic in which the utilization rate is 100% at 10 Mbps, allocates a link bandwidth in which the stability level is 90 to traffic in which the utilization rate is 80% at 10 Mbps, and allocates a link bandwidth in which the stability level is 70 to traffic in which the utilization rate is 50% at 10 Mbps. It is to be noted that an available bandwidth in which the stability level is 100 or an available bandwidth in which the stability level is 90 can be allocated to traffic in which the utilization rate is 50%. However, in the present exemplary embodiment, an available bandwidth in which a difference obtained by subtracting the value of the utilization rate from the value of the stability level is minimized is allocated to traffic.

In step S3, the path control unit 202 searches for paths based on a processing result of step S2, sets a path having the best condition among the searched paths as a path for traffic, and reports information regarding bandwidth allocation or the like of each modulation scheme in each link to the communication devices 102 to 105. Here, the path having the best condition is a path configured with a link having the highest goodness of fit in accommodating traffic of each link. It is to be noted that, for example, it is possible to obtain the goodness of fit in accordance with a method as will be described later in Example 3. At this time, if no path satisfying traffic requirements has been found, the path control unit 202 reports a bandwidth assignable in a path closest to the requirements to the communication devices 102 to 105, and if responses indicating that setting of the reported bandwidth is permitted are received from the communication devices 102 to 105, the path is set as a path for traffic.

In the final step S4, the communication devices 102 to 105 perform bandwidth control for traffic so that bandwidth allocation processed in step S3 operates.

Figure 6:
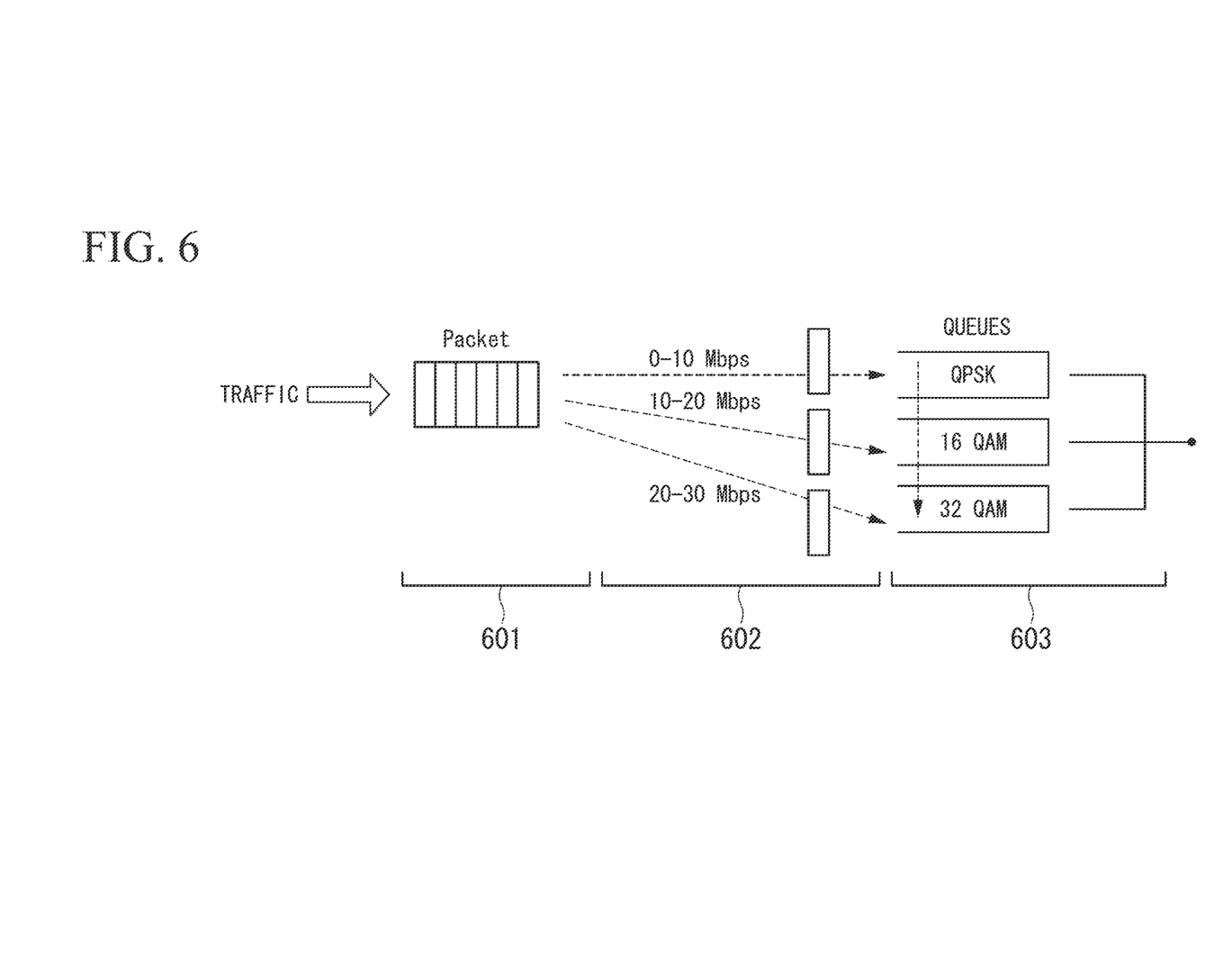
FIG. 6 is an explanatory diagram illustrating operations of communication devices when bandwidth control is performed by providing a queue for each modulation scheme.

FIG. 6 is an explanatory diagram illustrating operations of the communication devices 102 to 105 when bandwidth control is performed by providing a queue for each modulation scheme.

Hereinafter, the operations of the communication devices 102 to 105 (operations in step S4) when the bandwidth control is performed by providing the queue for each modulation scheme will be described with reference to FIG. 6.

Because a stability level of a bandwidth is determined by a stability level of a modulation scheme and a bandwidth secured using the modulation scheme, queues for modulation schemes (for example, a queue for QPSK, a queue for 16 QAM, and a queue for 32 QAM) are provided in advance in the queues 302 of the communication devices 102 to 105. Then, the communication unit 301 measures an inflow amount of traffic in a wireless link and reports the measured inflow amount to the classifier/shaper 303 (processing section 601). The classifier/shaper 303 places packets in respective corresponding queues in accordance with the inflow amount of the traffic based on the measured inflow amount of the traffic and a result of bandwidth allocation in step S3 (processing section 602). That is, as illustrated in FIG. 6, the classifier/shaper 303 outputs a packet of 0 to 10 Mbps to the QPSK queue, outputs a packet of 10 to 20 Mbps to the 16 QAM queue, and outputs a packet of 20 to 30 Mbps to the 32 QAM queue. Then, the packets are output by priority control in the order of the QPSK queue, the 16 QAM queue, and the 32 QAM queue (processing section 603).

It is to be noted that all inflow packets exceeding the bandwidth allocated in step S3 are handled as best-effort traffic, and the packets are dropped or placed in dedicated best-effort queues. A packet remaining in each queue is output only when a transmission rate of the wireless link is greater than or equal to the transmission rate of the modulation scheme corresponding to each queue or the other queues having higher priority than each queue are empty. By doing as described above, it is possible to control an amount of traffic capable of being output in accordance with the magnitude of the link bandwidth.

In the path control device 101 in accordance with the present exemplary embodiment, bandwidth allocation depending on the utilization rate as described above is performed, and stepwise bandwidth control depending on a change of the link bandwidth is provided. As a result, when the utilization rates of the bandwidths required for respective pieces of traffic are different from each other, it is possible to expect more effective utilization of the link bandwidth than when a bandwidth is simply allocated in accordance with a CIR of traffic.

Further, for a network service provider, a more flexible network design is possible.

It is to be noted that the bandwidth control method of the wireless network in accordance with the present exemplary embodiment can also be implemented for a network in which a wired link and a wireless link are included together.

In addition, the bandwidth control method of the wireless network in accordance with the present exemplary embodiment can also be applied to any communication devices having a function of the path control device.

Further, the bandwidth control device of the wireless network in accordance with the present exemplary embodiment can be configured in such a way that a plurality of bandwidth control devices are arranged and operated in a network in a distributed manner.

Example 1

As a first example of the present exemplary embodiment, an example in which two pieces of traffic (hereinafter referred to as traffic A and traffic B) use the same link will be shown. When the stability level of the link bandwidth is that as illustrated in FIG. 5A, bandwidths are allocated to two pieces of traffic based on utilization rates.

Here, for the traffic A, the utilization rate of 0 to 20 Mbps is assumed to be 100 and the utilization rate of 20 to 60 Mbps is assumed to be 80. In addition, for the traffic B, the utilization rate of 0 to 20 Mbps is assumed to be 100 and the utilization rate of 20 to 40 Mbps is assumed to be 50.

In this case, for the traffic A, the path control unit 202 allocates a bandwidth of the stability level 100 at 20 Mbps and a bandwidth of the stability level 90 at 40 Mbps. Likewise, for the traffic B, the path control unit 202 allocates a bandwidth of the stability level 100 at 20 Mbps and a bandwidth of the stability level 70 at 20 Mbps. It is to be noted that traffic exceeding allocation is handled as best-effort traffic.

As also illustrated in FIG. 6, packets of the traffic A and the traffic B are placed in queues provided for modulation schemes in accordance with inflow amounts and bandwidths of the stability levels allocated to the traffic A and the traffic B. Here, when the modulation scheme of the wireless link is QPSK, the link bandwidth becomes 40 Mbps and the packet of the QPSK queue is preferentially output, and thus it is possible to maintain a bandwidth of 20 Mbps at a minimum for both the traffic A and the traffic B. In addition, when the modulation scheme of the wireless link becomes 16 QAM, packets in the 16 QAM queue can also be output, and thus the traffic A can maintain a bandwidth of 60 Mbps, and the traffic B can maintain a bandwidth of 20 Mbps.

In addition, when the modulation scheme of the wireless link becomes 32 QAM, the traffic A can maintain a bandwidth of 60 Mbps and the traffic B can maintain a bandwidth of 40 Mbps because packets in the 32 QAM queue can also be output. As a result, it is possible to secure bandwidths to be maintained at a minimum for both the traffic A and the traffic B when the quality of the wireless link is degraded. In addition, if the quality of the wireless link is slightly improved, traffic having a higher utilization rate can preferentially secure a bandwidth in accordance with an allocation method corresponding to a utilization rate of the traffic.

Example 2

As a second example of the present exemplary embodiment, a process of the path control unit 202 when a CIR, an average rate, and a peak rate of traffic are each known will be described.

In this case, in each link, bandwidths obtained from a stability level of a link bandwidth (i.e., a bandwidth capable of being maintained at a minimum by each link, an average bandwidth of each link, and a maximum bandwidth capable of being realized by each link) are used.

The bandwidth of capable of being maintained at a minimum by each link and the maximum bandwidth capable of being realized by each link can be obtained using threshold values of a stability level serving as references. That is, the bandwidth capable of being maintained at a minimum by each link is obtained by setting a stability level considered as a lower limit and determining a maximum bandwidth satisfying the stability level of the lower limit. In addition, the maximum bandwidth capable of being realized by each link is obtained by setting a stability level considered as an upper limit and determining a maximum bandwidth satisfying the stability level of the upper limit. For example, if the lower limit=100 and the upper limit=30 are used as the threshold values of the stability level, the bandwidth capable of being maintained at a minimum by each link becomes 40 Mbps satisfying a stability level of 100 and the maximum bandwidth capable of being realized by each link becomes 108 Mbps satisfying a stability level of 30.

Here, it is assumed that the CIR of traffic is 10 Mbps, the average rate is 20 Mbps, the peak rate is 40 Mbps, and the stability levels corresponding to bandwidths of a link are 100 at 0 to 40 Mbps, 90 at 40 to 80 Mbps, and 50 at 80 to 108 Mbps.

In this case, the path control unit 202 verifies whether or not the link satisfies all the following three determination criteria.

(1) It is determined whether or not 10 Mbps, which is the CIR of traffic, can be accommodated in a link bandwidth in which the stability level is 100 (the bandwidth capable of being maintained at a minimum by each link).

(2) It is determined whether or not 20 Mbps, which is the average rate of traffic, can be accommodated in an average bandwidth of the link. It is to be noted that here the average bandwidth of the link is calculated using the stability levels of the link bandwidth. The average bandwidth becomes 40*100/100+(80−40)*90/100+(108−80)*50/100=90 Mbps. Consequently, more specifically, the sum of average bandwidths of traffic already using the link is subtracted from the average bandwidth of the link, and it is determined whether or not an obtained difference is greater than or equal to the average rate of traffic to be accommodated.

(3) It is determined whether or not the peak rate of traffic can be accommodated in a maximum bandwidth capable of being realized by the link.

In this case, the sum of CIRs of traffic currently using the link is subtracted from the maximum bandwidth capable of being realized by the link, and it is determined whether or not the above-described traffic can be accommodated based on whether or not an obtained difference is greater than or equal to the peak rate of traffic to be accommodated.

If all the above-described three determination criteria are satisfied, it is determined that the link can accommodate the above-described traffic.

The above-described three determination criteria are applied to each link, and a control bandwidth and a path for traffic are set by selecting a link from among links capable of being accommodated. After the traffic is accommodated, scheduling is performed so that each link can maintain at least a CIR of traffic.

Example 3

A third example of the present exemplary embodiment relates to the case in which a bandwidth of traffic is classified so that the utilization rate is most consistent with the stability level of the link bandwidth as an example of a bandwidth allocation method in a process of the path control unit 202 of step S2.

Here, it is assumed that the stability levels corresponding to bandwidths of a link are 100 at 0 to 40 Mbps, 90 at 0 to 80 Mbps, and 50 at 80 to 108 Mbps.

First, a bandwidth of traffic is classified so that the values of utilization rates are as close as possible the values of the stability levels of the link.

Figure 7:
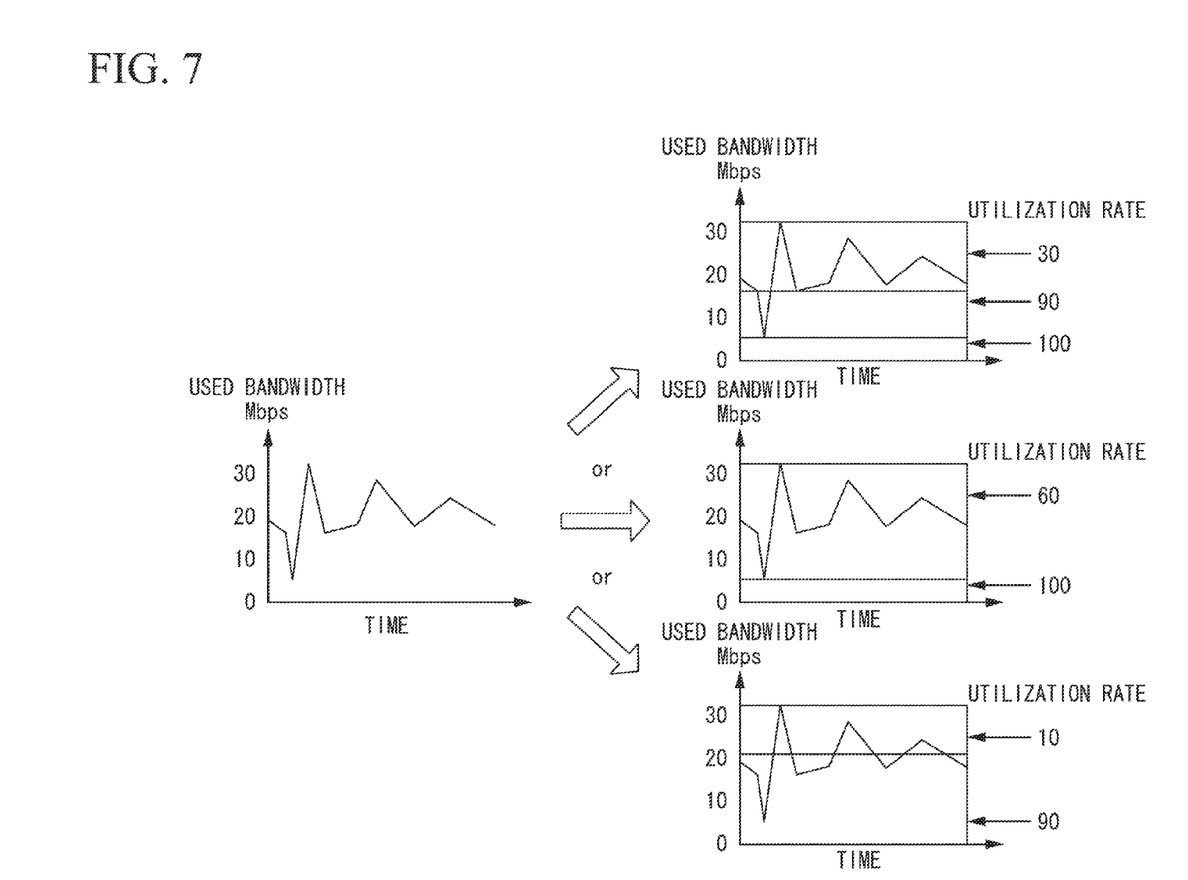
FIG. 7 is an explanatory diagram illustrating a method for classifying traffic to be performed by a path control unit of the path control device.

FIG. 7 is an explanatory diagram illustrating a traffic classifying method to be performed by the path control unit 202 of the path control device.

In order to classify a bandwidth of traffic so that the values of utilization rates are as close as possible the values of stability levels of a link bandwidth, it is possible to classify the bandwidth of the traffic in accordance with combinations of the values of a plurality of different utilization rates. For example, as illustrated in FIG. 7, the bandwidth of the traffic can be classified in accordance with utilization rates of (100, 90, 30), the bandwidth of the traffic can be classified in accordance with utilization rates of (100, 60), and the bandwidth of the traffic can be classified in accordance with utilization rates of (90, 10). In this case, a classifying method to be adopted is determined using a fit function. Then, it is determined whether or not traffic can be accommodated in order from a combination having larger values of the fit function.

Here, the fit function is a function indicating goodness of fit between a link bandwidth classifying method based on the stability level and a traffic classifying method based on the utilization rate. That is, goodness of fit is given as fit {traffic classifying method, link bandwidth classifying method}.

The fit function used here indicates a higher goodness of fit when the number of divisions for the traffic in accordance with the classifying method based on the utilization rate is closer to the number of divisions for the link bandwidth in accordance with the classifying method based on the stability level. In addition, if the numbers of divisions are the same between a plurality of classifying methods based on utilization rates, the fit function indicates a larger value of goodness of fit when the divided utilization rate is higher. In the above-described example, the goodness of fit becomes high values in the order of (100, 90, 30)>(100, 60)>(90, 10). That is, it is examined whether or not the link can accommodate traffic using the classifying methods in order from the classifying method of (100, 90, 30). Here, if the examined classifying method can accommodate traffic, traffic is classified using this classifying method, and a link bandwidth of a corresponding stability level is allocated. In contrast, if the traffic cannot be accommodated no matter what classifying method is used, it is determined that the link is unavailable.

It is to be noted that a path for traffic becomes a path in which a link with a high goodness of fit has priority.

Here, a simple fit function is used. However, as the fit function, it is also possible to select a classifying method suitable in time as well as in volume by also considering a correlation between a period in which traffic is generated and a period in which a link bandwidth is available.

Example 4

A fourth example of the present exemplary embodiment relates to the case in which bandwidth control corresponding to the magnitude of a link bandwidth is realized using a single queue in the process of step S4.

Figure 8:
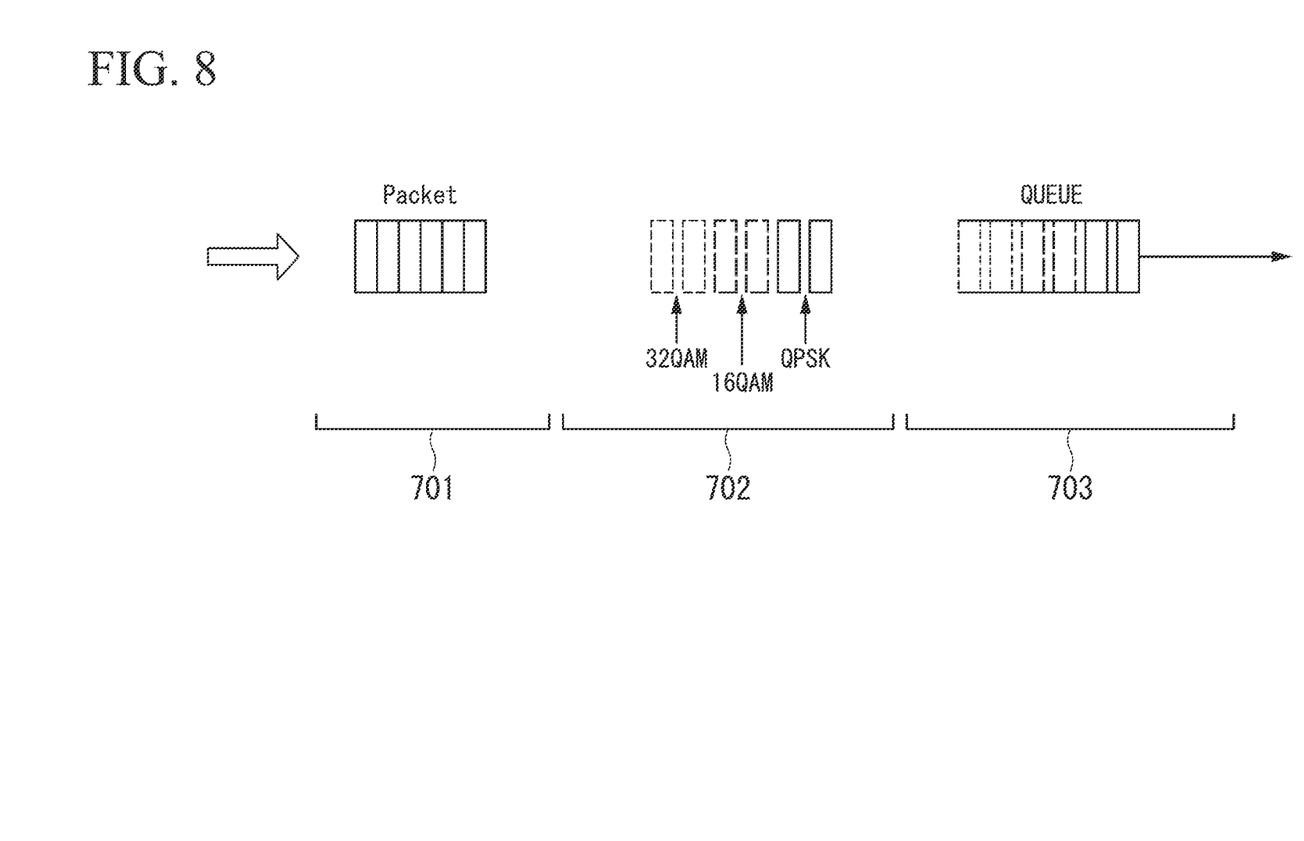
FIG. 8 is an explanatory diagram illustrating a packet processing method in the communication devices.

FIG. 8 is an explanatory diagram illustrating a packet processing method in the communication devices 102 to 105.

As described above, after bandwidth allocation is performed for traffic, an operation of performing marking corresponding to a stability level of an allocated bandwidth is performed for a packet of inflow traffic.

It is assumed that, for given traffic F, a bandwidth of 10 Mbps capable of being secured with QPSK, a bandwidth of 10 Mbps capable of being secured with 16 QAM, and a bandwidth of 10 Mbps capable of being secured with 32 QAM are allocated. First, the number of inflow packets of the traffic F is measured with a meter (not illustrated) (processing section 701). Next, in accordance with the measured inflow amount of the traffic, the packets are marked (e.g., QPSK in the case of an inflow amount of traffic of 0 to 10 Mbps, 16 QAM in the case of an inflow amount of traffic of 10 to 20 Mbps, and 32 QAM in the case of an inflow amount of traffic of 20 to 30 Mbps. Association of packets with modulation schemes) and placed in the queue (processing section 702). Next, after packets are dropped depending on a modulation scheme used by a link (e.g., marked packets other than those of QPSK are dropped when a current modulation scheme of the link is QPSK), bandwidth control is performed by outputting packets within the queue (processing section 703).

Example 5

A fifth example of the present exemplary embodiment relates to the case in which a process of the communication device in step S4 is realized using weighted round robin (WRR) for scheduling packets.

As also shown in the above-described Examples 1 to 3, bandwidth allocation for traffic is performed first. Because a link bandwidth is changed depending on a modulation scheme used by a link, variable bandwidth control is performed (a control bandwidth for traffic is changed) by changing a weight for the given traffic F from the link bandwidth and a traffic amount of other priority traffic so as to conform to an allocation bandwidth (an allocation amount of a bandwidth for the traffic F). Here, when the sum of the weights of all traffic in each modulation scheme M is $B_M$, the weights assigned to the traffic F when the respective modulation schemes are used are $30 \times B_{32\ QAM}/108$ in the case of 32 QAM, $20 \times B_{16\ QAM}/80$ in the case of 16 QAM, and $10 \times B_{QPSK}/40$ in the case of QPSK. Then, the weight assigned to the traffic F is varied in accordance with a fluctuation of each link bandwidth. Thereby, it is possible to realize control of a control bandwidth corresponding to a link bandwidth.

Example 6

A sixth example of the present exemplary embodiment relates to the case in which bandwidth allocation as will be described below is performed in the process of the path control unit 202 in step S2.

In this example, after traffic is classified in accordance with the utilization rate, a link bandwidth of $d \times (x/y)$ Mbps having a stability level y % (where y≥x) is allocated for d Mbps at which each utilization rate is x %. For example, when a bandwidth is allocated for 10 Mbps at which the utilization rate is 50% within traffic, 5 Mbps is allocated if a bandwidth of a stability level of 100% is used and 50/9 Mbps is allocated if a bandwidth of a stability level of 90% is used.

In this case, in step S4, an output operation is performed for each queue provided for each modulation scheme.

Thereby, it is possible to multiplex traffic including a number of bandwidths having small utilization rates in accordance with the magnitude of a stability level of a link bandwidth.

As described above, main points of the exemplary embodiment and the examples of the present invention are as follows.

(1) They are applied to a wireless network using adaptive modulation.

(2) A stability level, which is a probability that a bandwidth is available in a link, is obtained, and traffic is accommodated.

(3) A utilization rate of a bandwidth used by traffic is obtained and a link bandwidth of a stability level corresponding to the utilization rate of the traffic is allocated.

In this way, the bandwidth allocation methods in accordance with the exemplary embodiment and the examples of the present invention are bandwidth allocation methods for traffic in a link in which a bandwidth fluctuates, and they are different from the above-described method of Patent Document 1 in which a bandwidth of a constant rate is allocated. Therefore, the bandwidth control devices of the wireless network in accordance with the exemplary embodiment and the examples of the present invention also have configurations and means different from those of Patent Document 1.

In addition, the methods of the exemplary embodiment and the examples of the present invention are different from that disclosed in Patent Document 2 for the above-described reason. Therefore, the bandwidth control devices of the wireless network in accordance with the exemplary embodiment and the examples of the present invention also have configurations and means different from those of Patent Document 2.

While the present invention has been particularly shown and described with reference to the exemplary embodiment and the examples thereof, the present invention is not limited to the exemplary embodiment and the examples. It will be understood by those of ordinary skill in the art that various changes in form and details may be made therein without departing from the spirit and scope of the present invention as defined by the claims.

This application is based upon and claims the benefit of priority from Japanese Patent Application No. 2009-278499, filed Dec. 8, 2009, the disclosure of which is incorporated herein in its entirely by reference.

INDUSTRIAL APPLICABILITY

The present invention is, for example, applicable to bandwidth control of traffic in a network configured with a wireless link using adaptive modulation. In accordance with the present invention, it is possible to perform bandwidth control corresponding to a fluctuation of a link bandwidth for traffic and it is possible to accommodate more traffic while maintaining communication quality of the traffic.

DESCRIPTION OF REFERENCE NUMERALS

101 Path control device
102, 103, 104, 105 Communication device
201 Communication unit
202 Path control unit (stability level calculation means, utilization rate calculation means, allocation means, and path control means)
203 Topology information management unit
204 Traffic information management unit
205 Link information management unit
301 Communication unit
302 Queues
303 Classifier/shaper (control means)
304 Resource management unit (control means)

The invention claimed is:

1. A bandwidth control device of a wireless network comprising:
   a stability level calculation unit which calculates a stability level indicating a probability that a bandwidth is available in a wireless link using adaptive modulation;
   a utilization rate calculation unit which calculates a utilization rate of a bandwidth used by traffic to be accommodated;
   an allocation unit which allocates, to the traffic, a link bandwidth of the stability level corresponding to the utilization rate of the traffic; and
   a path control unit which sets a path for the traffic in the wireless network including a communication device that performs communication over the wireless link based on the allocated link bandwidth.

2. The bandwidth control device of the wireless network according to claim 1, wherein the stability level calculation unit calculates the stability level based on a history of a modulation scheme previously used in the wireless link or a history of information indicating a radio wave environment of the wireless link.

3. The bandwidth control device of the wireless network according to claim 1, wherein the utilization rate calculation unit calculates the utilization rate for each bandwidth of the traffic based on a history of a bandwidth previously used in the traffic or a probability that a bandwidth required by the traffic is used.

4. The bandwidth control device of the wireless network according to claim 1, wherein the allocation unit allocates the link bandwidth of the corresponding stability level in the wireless link to the traffic for each utilization rate of the traffic, and
the path control unit sets a control bandwidth of the traffic and the path in accordance with a transmission rate of the wireless link.

5. The bandwidth control device of the wireless network according to claim 1, wherein the allocation unit classifies the bandwidth used by the traffic to be accommodated for each utilization rate and classifies the link bandwidth for each stability level so that the stability level is most consistent with the utilization rate, and
the path control unit sets a control bandwidth of the traffic and the path in accordance with a transmission rate of the wireless link.

6. The bandwidth control device of the wireless network according to claim 1, wherein the path control unit determines whether or not the wireless link is capable of accommodating the traffic using CIR, an average rate, and a peak rate of the traffic and the stability level, and sets a control bandwidth of the traffic and the path using a link capable of accommodating the traffic.

7. The bandwidth control device of the wireless network according to claim 1, wherein the allocation unit allocates, to the traffic, the link bandwidth of the stability level, the value of which being greater than or equal to the value of the utilization rate.

8. The bandwidth control device of the wireless network according to claim 2, wherein the information indicating the radio wave environment includes at least one of BER, SNR, and CINR.

9. The bandwidth control device of the wireless network according to claim 2, wherein the utilization rate calculation unit calculates the utilization rate for each bandwidth of the traffic based on a history of a bandwidth previously used in the traffic or a probability that a bandwidth required by the traffic is used.

10. The bandwidth control device of the wireless network according to claim 2, wherein the allocation unit allocates the link bandwidth of the corresponding stability level in the wireless link to the traffic for each utilization rate of the traffic, and
the path control unit sets a control bandwidth of the traffic and the path in accordance with a transmission rate of the wireless link.

11. The bandwidth control device of the wireless network according to claim 8, wherein the utilization rate calculation unit calculates the utilization rate for each bandwidth of the traffic based on a history of a bandwidth previously used in the traffic or a probability that a bandwidth required by the traffic is used.

12. The bandwidth control device of the wireless network according to claim 8, wherein the allocation unit allocates the link bandwidth of the corresponding stability level in the wireless link to the traffic for each utilization rate of the traffic, and
the path control unit sets a control bandwidth of the traffic and the path in accordance with a transmission rate of the wireless link.

13. The bandwidth control device of the wireless network according to claim 3, wherein the allocation unit allocates the link bandwidth of the corresponding stability level in the wireless link to the traffic for each utilization rate of the traffic, and
the path control unit sets a control bandwidth of the traffic and the path in accordance with a transmission rate of the wireless link.

14. The bandwidth control device of the wireless network according to claim 5, wherein the allocation unit classifies the bandwidth used by the traffic and classifies the link bandwidth using a correlation between a period in which the traffic is generated and a period in which the link bandwidth is available.

15. The bandwidth control device of the wireless network according to claim 7, wherein the allocation unit allocates, to the traffic, the link bandwidth of the stability level having a value with which a difference from the value of the utilization rate is minimized.

16. The bandwidth control device of the wireless network according to claim 7, wherein the allocation unit calculates a ratio between the utilization rate and the stability level, and allocates the link bandwidth to the traffic based on the ratio and the bandwidth used by the traffic.

* * * * *